US007004499B1

(12) United States Patent
Preisler

(10) Patent No.: US 7,004,499 B1
(45) Date of Patent: Feb. 28, 2006

(54) OCCUPANT PROTECTION SYSTEM FOR VEHICLE WITH AIR BAG

(75) Inventor: Darius J. Preisler, Macomb, MI (US)

(73) Assignee: Cadence Innovation LLC, Sterling Heights, MI (US)

( * ) Notice: Subject to any disclaimer, the term of this patent is extended or adjusted under 35 U.S.C. 154(b) by 553 days.

(21) Appl. No.: 09/620,581

(22) Filed: Jul. 20, 2000

(51) Int. Cl.
*B60R 21/20* (2006.01)

(52) U.S. Cl. .................................. 280/732; 280/728.3
(58) Field of Classification Search ............ 280/728.3, 280/732, 731, 743
See application file for complete search history.

(56) References Cited

U.S. PATENT DOCUMENTS

| 5,333,901 | A | | 8/1994 | Barnes | |
|---|---|---|---|---|---|
| 5,427,409 | A | | 6/1995 | Henseler et al. | |
| 5,433,472 | A | * | 7/1995 | Green et al. | 280/728.2 |
| 5,447,326 | A | * | 9/1995 | Laske et al. | 280/728.3 |
| 5,456,487 | A | | 10/1995 | Daris et al. | |
| 5,456,493 | A | * | 10/1995 | Bauer et al. | 280/743.1 |
| 5,460,401 | A | | 10/1995 | Gans et al. | |
| 5,480,183 | A | * | 1/1996 | Ward et al. | 280/728.2 |
| 5,531,477 | A | * | 7/1996 | Madrigal et al. | 280/743.1 |
| 5,536,037 | A | * | 7/1996 | Cherry | 280/728.3 |
| 5,536,043 | A | * | 7/1996 | Lang et al. | 280/753 |
| 5,755,460 | A | | 5/1998 | Barnes et al. | |
| 5,915,724 | A | | 6/1999 | Daris et al. | |
| 5,971,431 | A | | 10/1999 | Wohllebe et al. | |
| 6,019,390 | A | * | 2/2000 | Keshavaraj | 280/743.1 |
| 6,024,377 | A | | 2/2000 | Lane, Jr. | |

* cited by examiner

*Primary Examiner*—Michael Cuff
(74) *Attorney, Agent, or Firm*—Brooks Kushman P.C.

(57) ABSTRACT

An occupant protection system which deploys a deployable air bag from a concealed inner location in a vehicle instrument panel having an opening. An air bag portion covers the opening sufficiently to conceal the air bag in a concealed location. Upon deployment, the air bag portion remains as a portion of the air bag. This allows the air bag to inflate and fully deploy uninhibited, and eliminates the potential for an air bag cover or pieces thereof to be propelled toward, and injuriously impact, the occupant.

4 Claims, 2 Drawing Sheets

OCCUPANT PROTECTION SYSTEM FOR VEHICLE WITH AIR BAG

TECHNICAL FIELD

The present invention relates to a system of deploying an air bag such that the air bag is not obstructed upon deployment.

BACKGROUND ART

Inflatable air bags for the protection of vehicle occupants are well known. Typically the passenger side air bag is hidden inside the instrument panel, concealed by an air bag cover. Inflation of the air bag occurs with great force and the air bag usually exits the instrument panel by impacting the cover and forcing it outward, potentially in the direction of the occupants. The consequences of this impact are twofold: first, deployment of the air bag can be inhibited, and second, the air bag cover can detach or break apart, often hurtling the cover or pieces of it toward the occupants.

U.S. Pat. No. 5,460,401, issued on Oct. 24, 1995 to Gans et al., describes a method to address the potential injury to occupants by providing an air bag cover that is limited in its movement by the presence of a flexible tether. One end of the tether attaches to the cover, the other end attaches to the panel edge or housing. Although the tether reduces the risk to occupants by restricting the outward motion of the cover, the cover is still thrust outward with great force and the potential for injuriously impacting the occupants has not been eliminated.

U.S. Pat. No. 5,456,487, issued on Oct. 10, 1995 to Daris et al., describes an instrument panel assembly that provides an air bag cover that consists of two hinged doors within the instrument panel. Both of the doors are designed to swing outwardly as the air bag is deployed. Although the outward movement of the doors is again restricted, the doors are still thrust outward with great force and body parts in close proximity to the doors—e.g., hands and wrists-could still be injuriously impacted.

U.S. Pat. No. 5,915,724, issued on Jun. 29, 1999 to Daris, et al., describes an air bag cover assembly that provides an air bag cover with a single hinged door. The '724 patent provides a device that has the same limitations as that provided by the '487 patent. Although manufactured differently than a two-door hinged cover, the single-door cover still presents the same risk to the occupants as the two-door design.

U.S. Pat. No. 5,971,431, issued on Oct. 26, 1999 to Wohllebe, et al., describes an air bag arrangement that provides a cover with a guide to direct movement of the cover. Upon deployment of the air bag, the air bag impacts the guide and a downward force component moves the cover to reveal an opening. The movement of the cover is limited by swing levers that restrain the cover from moving toward the occupant. This eliminates the problem of the cover propelling toward the occupant; however, the cover does not move until the guide is impacted by the air bag, and this could potentially inhibit the air bag deployment.

U.S. Pat. No. 6,024,377, issued on Feb. 15, 2000 to Lane, Jr., describes an air bag restraint system, one embodiment of which provides a jaw-like air bag cover with side rails. Upon inflation of the air bag, a shaft is forced into the intersection of the side rails, causing a camming action which opens the jaws. Once open, the air bag deploys through the opening in the jaws. This design has the same shortcoming as the '431 patent; although the cover is not propelled in the direction of the occupant, the air bag must forcibly open the cover, and this could potentially inhibit the air bag deployment.

Another embodiment of the '377 patent overcomes the potential problem of inhibiting deployment of the air bag, but introduces the problem of a cover moving toward the occupant. This embodiment provides an air bag concealed within a sliding drawer. Upon receipt of a signal from a controller, gas is used both to inflate the air bag, and to propel the drawer forward which allows the air bag to deploy through an opening at the top of the drawer. The system may have separate inflators—that is, one for the air bag and one to force the drawer open—in which case they may work concurrently or sequentially, or a single inflator can serve both functions. Because the drawer is sliding toward the occupant, potentially with great force, the risk of injury to the occupant remains.

Accordingly, it is desirable to provide an improved system of allowing an air bag to deploy which overcomes the above referenced shortcomings of prior art air bag deployment systems. Specifically, it is desirable to provide a system of allowing an air bag to deploy without obstruction, such that the air bag need not impact the air bag cover, and therefore deployment is not inhibited. This eliminates the potential for occupant injuries caused by the propulsion of the cover or pieces thereof.

DISCLOSURE OF INVENTION

The present invention provides a system of allowing an air bag to deploy without obstruction. This avoids inhibition of the air bag as it deploys and allows it to fully deploy unimpeded, helping to ensure passenger safety. Moreover, this design eliminates outward propulsion of air bag covers and their debris, which can be propelled with great force, potentially causing injury to the occupants. The air bag is normally deflated and contained within a housing in the instrument panel near the vicinity of the occupant's seat. As a result of vehicle impact, the air bag deploys through an opening in the instrument panel, inflating and leaving the housing as it deploys.

In one embodiment, the skin of the air bag covers an opening in the instrument panel, eliminating the need for a separate air bag cover. The skin of the air bag is flush with, and blends into, the surface of the instrument panel cover. Upon deployment, the air bag is completely unobstructed and this embodiment provides no covers to be propelled outward toward the occupants.

In another embodiment, the air bag cover is fixedly adhered to the air bag such that when the air bag is in its normally stored position, the cover is flush with, and blends into, the instrument panel cover. The cover is fixedly adhered to the air bag such that it will remain fixedly adhered upon deployment of the air bag. The air bag is contained within a housing in the instrument panel such that the cover will be on the side of the air bag opposite the passenger when the air bag is in its fully deployed position.

Accordingly, an object of the present invention is to provide a system for allowing an air bag to deploy in a vehicle such that the air bag cover will not obstruct the air bag when the air bag deploys.

Another object of the invention is to provide a system for allowing an air bag to deploy such that the air bag cover will not propel toward the occupants in such a way as to injuriously impact them.

BEST MODE FOR CARRYING OUT THE INVENTION

Figure 1:
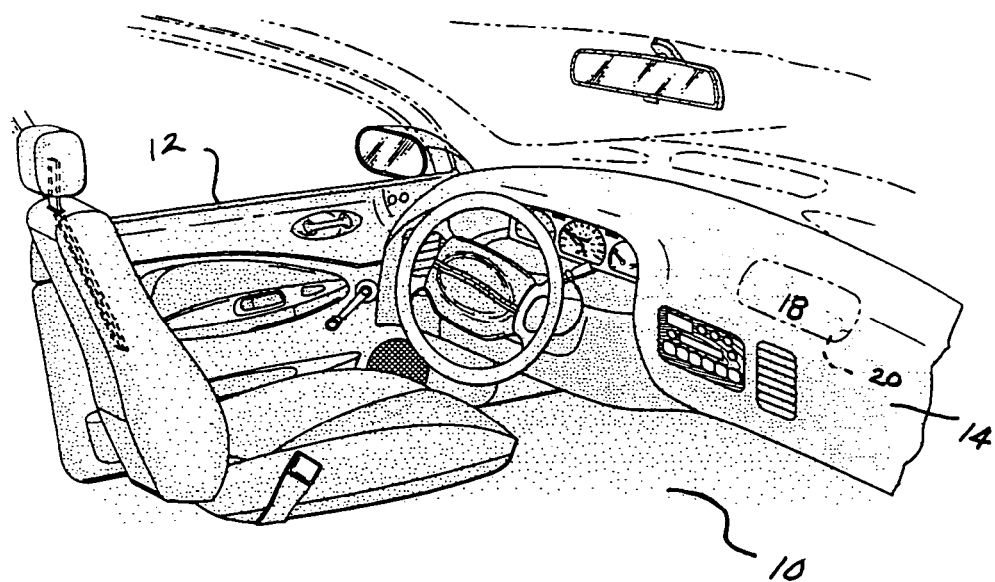
FIG. 1 shows a fragmentary perspective view of the front interior of a vehicle, including instrument panel, wherein the air bag is in its normally concealed state, the skin of the air bag itself forming the cover in accordance with an embodiment of the present invention.
Figure 2:
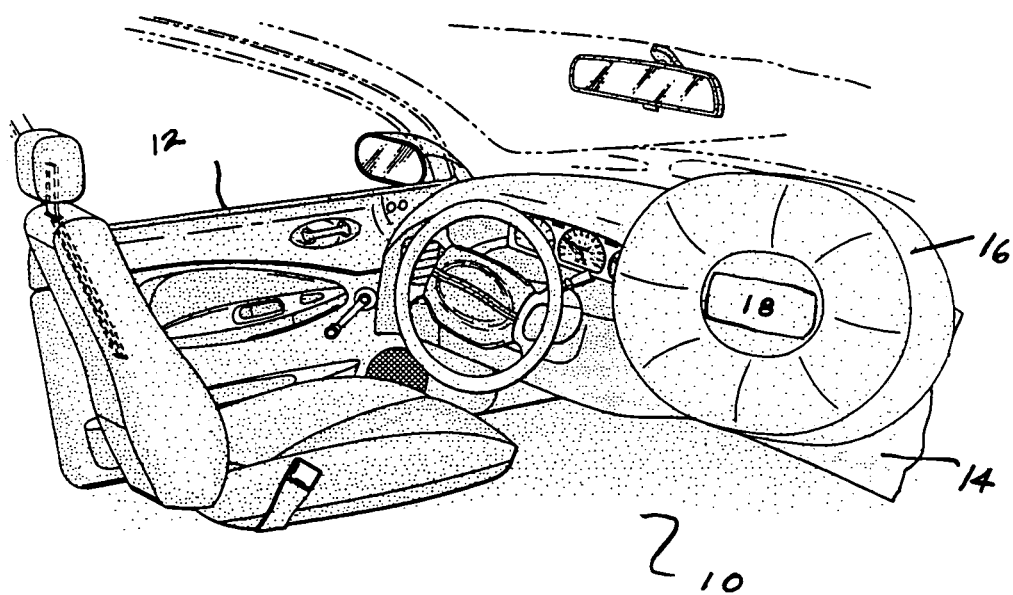
FIG. 2 shows a fragmentary perspective view of the front interior of a vehicle as shown in FIG. 1, wherein the air bag is in its fully inflated and deployed state in accordance with an embodiment of the present invention.
Figure 3:
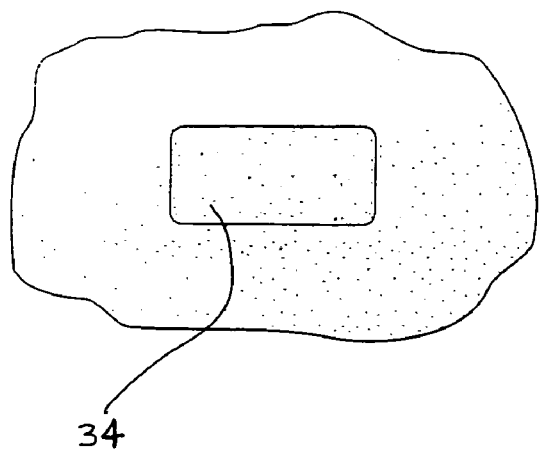
FIG. 3 shows a fragmentary front view of an instrument panel, featuring an air bag cover fixedly adhered to the skin of the air bag flush with the surface of the instrument panel in accordance with an embodiment of the present invention.
Figure 4:
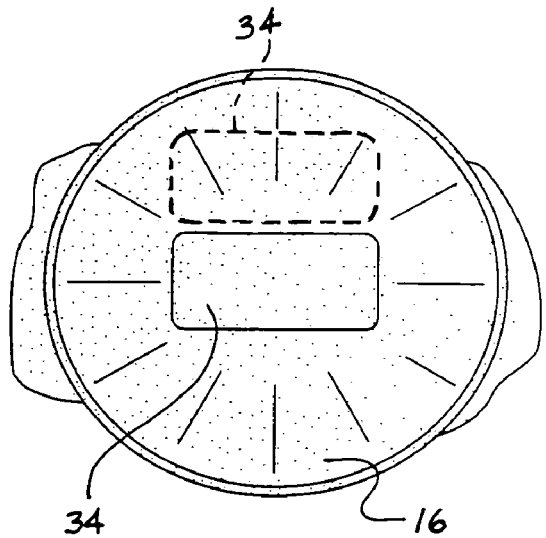
FIG. 4 shows a fragmentary front view of the instrument panel shown in FIG. 3, with an air bag in its fully inflated and deployed state, with the air bag cover fixedly adhered to the inflated air bag on the side opposite the passenger, in accordance with an embodiment of the present invention.
Figure 5:
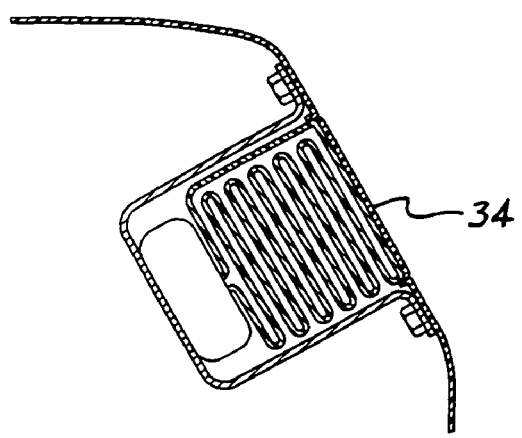
FIG. 5 shows a fragmentary side sectional view of the air bag cover shown in FIG. 3 and an air bag in its normally concealed and pre-deployment state.
Figure 6:
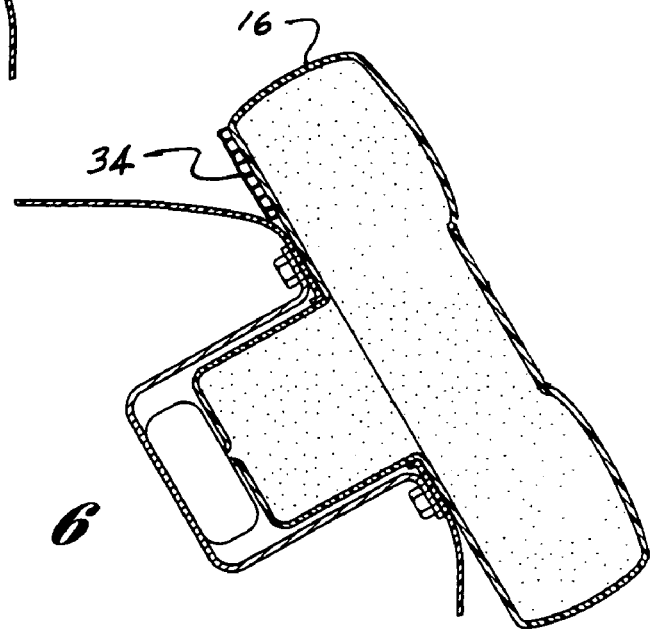
FIG. 6 shows a fragmentary side sectional view of the air bag cover and air bag shown in FIG. 4.

One embodiment of the present invention is shown in FIGS. 1 and 2. These figures show a perspective view of the front interior 10 of a vehicle 12, including an instrument panel 14, wherein an air bag 16 is in its normally concealed state (FIG. 1). A skin 18 of the air bag 16 covers an opening 20 in the instrument panel 14 and is substantially flush with, and blends into, the instrument panel. Upon inflation, the deployment of the air bag is unobstructed and the skin 18 remains and is retained as a part of the inflated air bag.

Another embodiment of the present invention is shown in FIGS. 3–6. The air bag 16 has a separate cover 34 as a panel fixedly attached or adhered to a portion of the air bag such that when the air bag is in its normally deflated state, the cover 34 is substantially flush and in harmony with the instrument panel 14, FIGS. 3 and 5. Upon inflation and deployment of the air bag, the air bag cover remains and is retained fixedly adhered or attached to the air bag and moves to a location on the side of the air bag opposite the occupants, FIG. 4 (phantom) and 6. This allows the air bag to deploy without obstruction and eliminates the potential for the door or pieces of the door to injuriously impact the occupants.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. An occupant protection system for deploying a deployable air bag from a vehicle instrument panel having an opening, the protection system comprising:
   an air bag normally in a deflated condition immediately adjacent the instrument panel opening and deployable through the instrument panel opening as a protection for the occupant; and
   the air bag having a skin, and a portion of the skin forming a closure portion that provides the sole closure of the instrument panel opening and is directly exposed to an occupant compartment of the vehicle when the air bag is deflated, and the closure portion of the air bag moving outwardly from the instrument panel opening as the air bag is deployed.

2. In combination, a vehicle having an air bag deployable upon vehicle impact and an occupant protection system for deploying a deployable air bag from a vehicle instrument panel having an opening, the protection system comprising:
   an air bag normally in a deflated condition immediately adjacent the instrument panel opening and deployable upon vehicle impact through the instrument panel opening as a protection for the occupant; and
   the air bag having a skin, and a portion of the skin forming a closure portion that provides the sole closure of the instrument panel opening and is directly exposed to an occupant compartment of the vehicle when the air bag is deflated, and the closure portion of the air bag moving outwardly from the instrument panel opening as the air bag is deployed.

3. The occupant protection system of claim 1 wherein the skin that closes the opening is flush with the vehicle instrument panel.

4. The combination of claim 2 wherein the skin that closes the opening is flush with the vehicle instrument panel.

* * * * *